United States Patent [19]

Zipser et al.

[11] 4,289,436

[45] Sep. 15, 1981

[54] DELIVERY TRAY RELEASE MECHANISM FOR A BALE WAGON

[75] Inventors: Randall E. Zipser, Clovis; H. Berton Stringfellow, Fresno, both of Calif.

[73] Assignee: Sperry Corporation, New Holland, Pa.

[21] Appl. No.: 64,929

[22] Filed: Aug. 8, 1979

[51] Int. Cl.³ .............................................. B65G 57/03
[52] U.S. Cl. ...................................... 414/76; 414/58; 414/44
[58] Field of Search .................. 414/38, 39, 40, 43, 414/44, 48, 46, 63, 68, 58, 478, 492, 497, 502, 509, 511, 517, 525, 647, 645, 654, 595, 70, 80, 81, 69, 76, 52; 209/518–522, 933

[56] References Cited

U.S. PATENT DOCUMENTS

| | | | |
|---|---|---|---|
| 2,437,007 | 3/1948 | Thorns | 414/647 |
| 3,122,230 | 2/1964 | Bogue | 414/48 X |
| 3,370,719 | 2/1968 | Oler . | |
| 3,375,940 | 4/1968 | Thompson et al. . | |
| 3,653,506 | 4/1972 | Turner et al. | 414/48 X |
| 3,952,881 | 4/1976 | Knudson | 414/58 |

FOREIGN PATENT DOCUMENTS 527185 3/1954 Belgium ............................. 414/647
1012258 7/1957 Fed. Rep. of Germany ...... 414/645

Primary Examiner—Frank E. Werner
Attorney, Agent, or Firm—Larry W. Miller; Frank A. Seemar; James R. Bell

[57] ABSTRACT

A bale wagon for picking up bales of crop material from the field and forming them into a generally symmetrical pyramidal stack for deposit at a selected location is provided. The bale wagon includes a mobile frame pivotally supporting a stack forming load bed, a bale support and transfer mechanism for depositing the bales at a predetermined position on the load bed, a pickup mechanism for moving the bales from the field to the support and transfer mechanism, and a pusher mechanism for moving the bales along the load bed from the predetermined position. A control mechanism coordinates the functioning of the components so as to form a multi-layered stack of bales with each succeeding layer centered on and containing one less row of bales than the previous layer.

4 Claims, 16 Drawing Figures

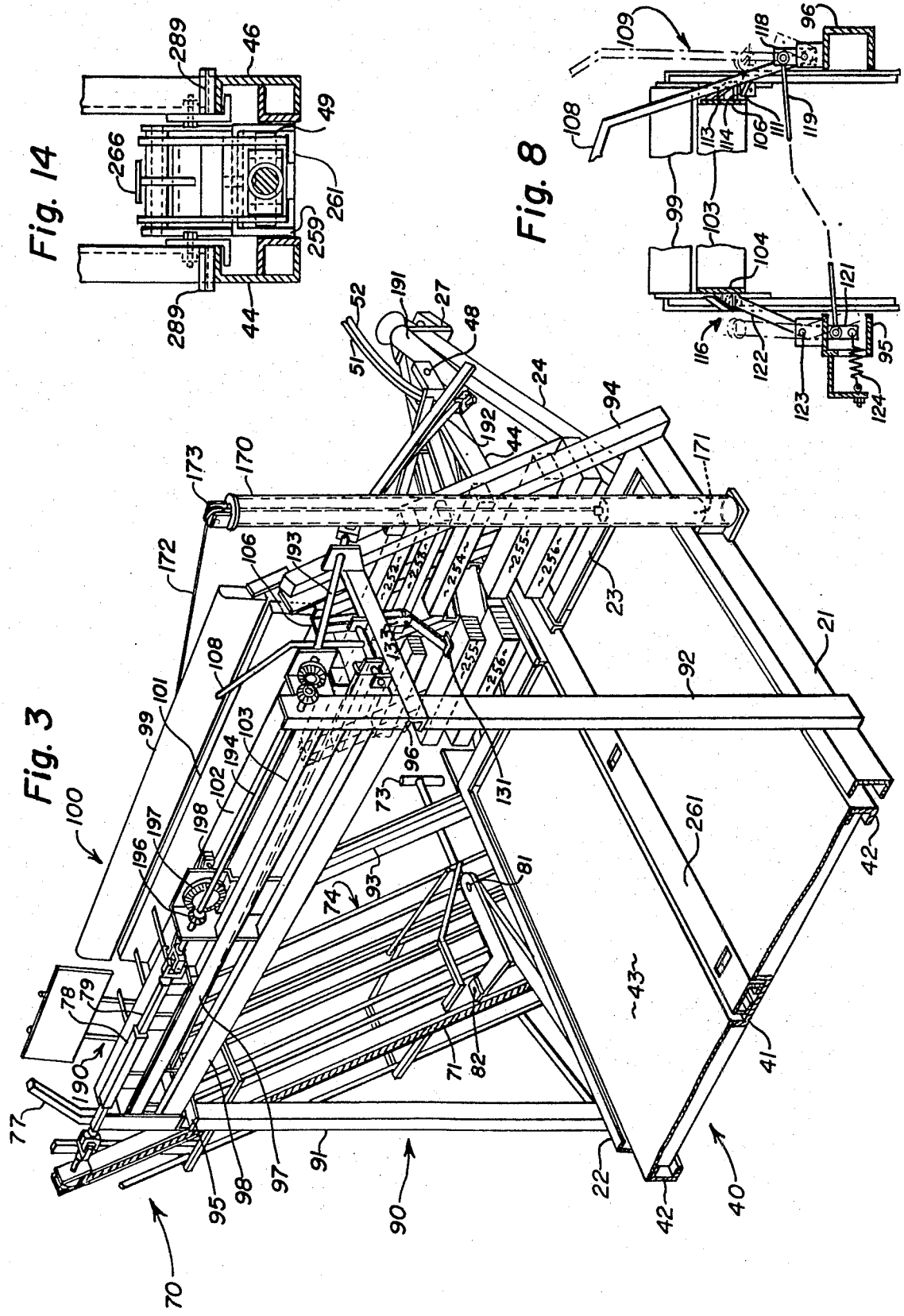
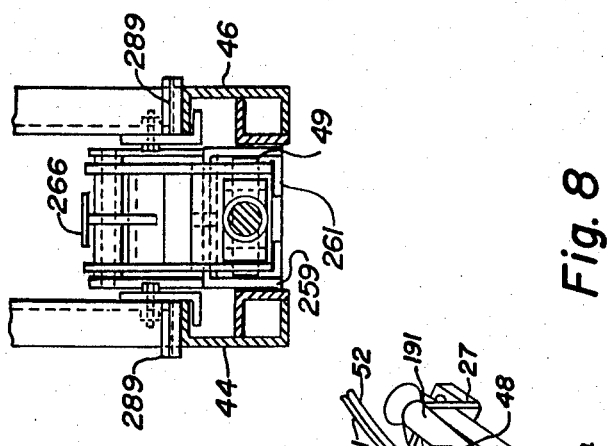
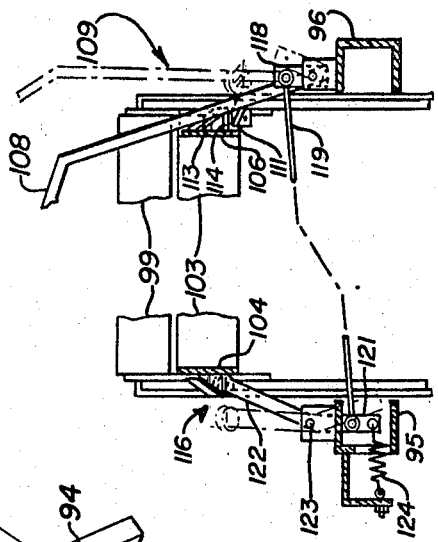

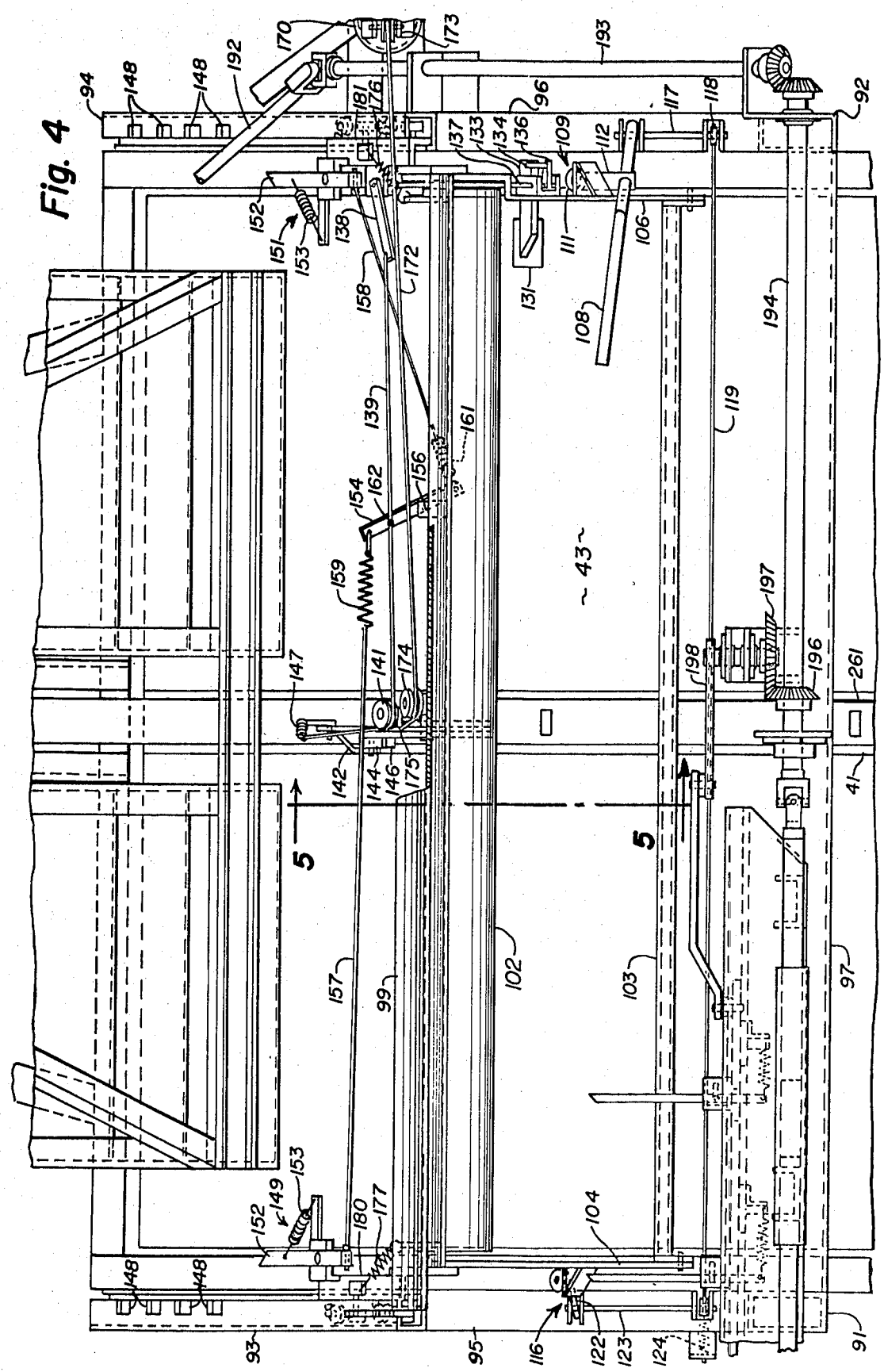

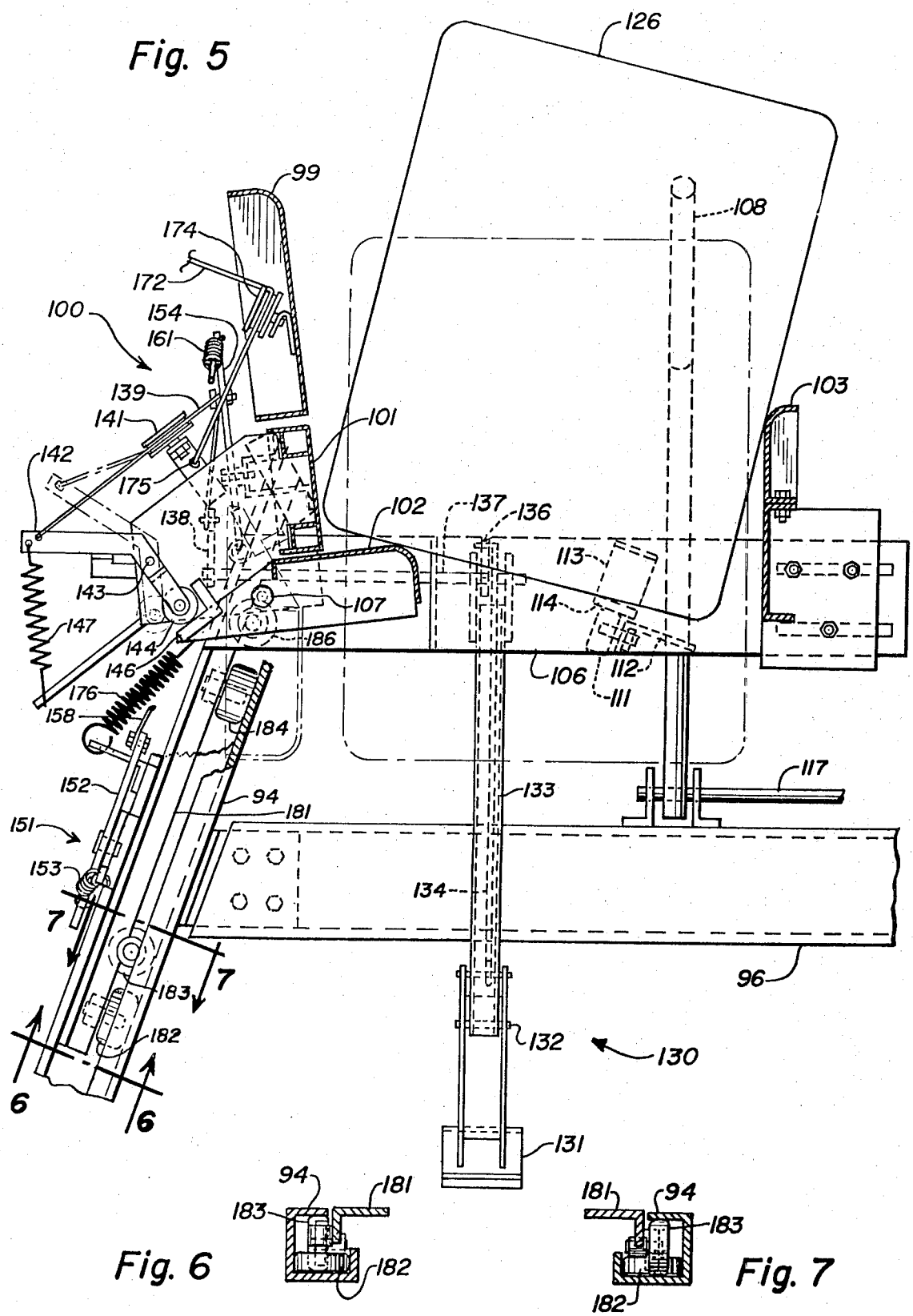

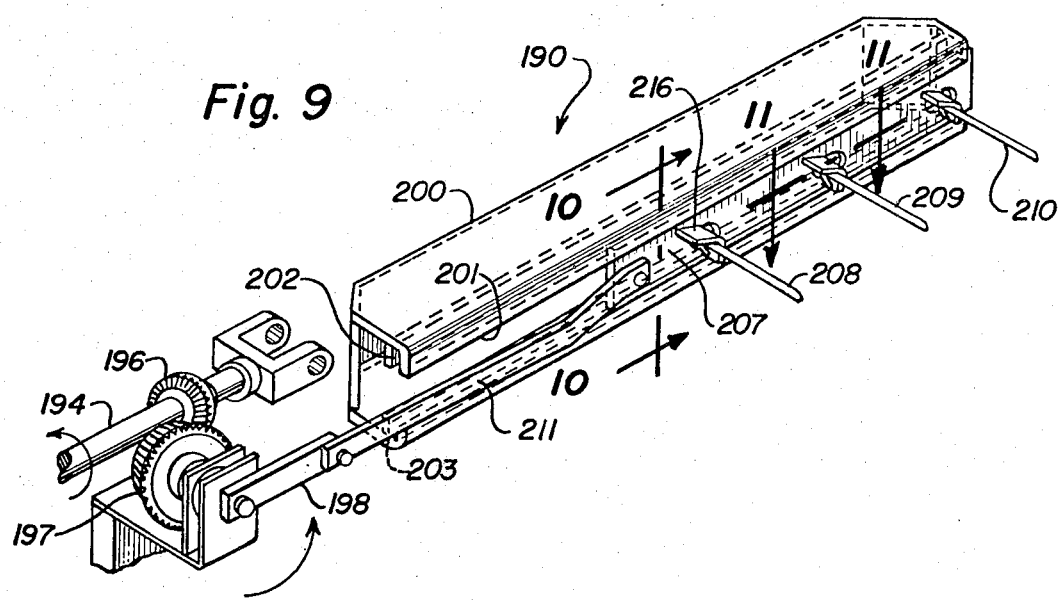
Fig. 9
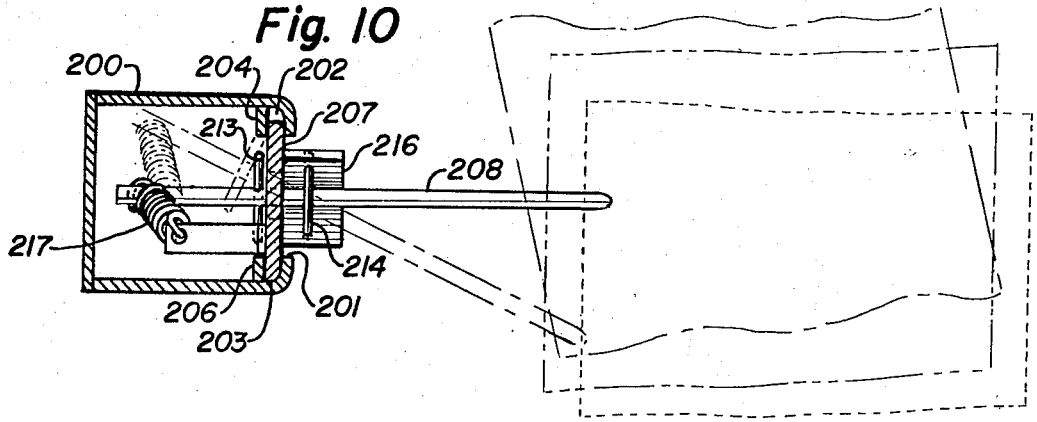
Fig. 10
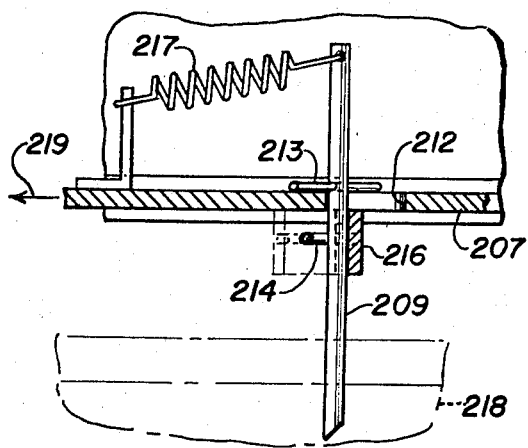
Fig. 11
Fig. 12

DELIVERY TRAY RELEASE MECHANISM FOR A BALE WAGON

BACKGROUND OF THE INVENTION

This invention relates generally to a bale wagon, and specifically to mechanisms for controlling the operation of a bale delivery tray in a bale wagon which forms a pyramid-like stack.

The technological advancement of farming has, like most other industries, been a gradual yet consistent process. In reality, the efficient production of many crops is limited in part by materials packaging and handling problems. Baled crops, of concern to the instant invention, such as hay were initially hand loaded onto a wagon, transported to the desired location, and manually restacked. The unreliability and cost in labor and time became, in many instances, prohibitive, resulting in the commercialization of semi-automatic bale wagons which drastically reduce the required manpower to move the crop material from the field to storage. Further advancements in machinery have resulted in completely automatic bale handling equipment which not only stacks the bales, but can also automatically form tied blocks which may be very efficiently loaded onto trucks for transport to remote locations.

The invention to be described below is to a unique automatic or semi-automatic stack forming machine which is particularly well suited for that large segment of the farming industry not concerned with the long distance commercial transport of bales. The machine does not form tied blocks, but does handle a large number of bales and deposits them in a sturdy, freestanding stack at any desired location.

SUMMARY OF THE INVENTION

It is an object of the instant invention to provide mechanisms in a bale wagon capable of automatically forming a free standing pyramid-like stack of bales.

It is another object of the instant invention to provide mechanisms in a bale wagon which will automatically form a free standing multi-layered stack of bales with each succeeding layer of bales centered on and containing one less row of bales than the previous layer.

It is a further object of the instant invention to provide control mechanisms for a bale delivery tray in a bale wagon which cause the bale delivery tray to deposit bales at the proper location for stack formation.

It is a feature of the mechanisms of the instant invention that a depending trip foot engages a tripping surface to cause the bottom member of a bale delivery tray to pivot, thus depositing the row of bales in the proper location for stack formation.

These and other features and objects are attained in the instant invention by the provision of a bale wagon for picking up bales of crop material from the field and forming them into a generally summetrical pyramidal stack for deposit at a selected location. The bale wagon includes a mobile frame pivotally supporting a stack forming bed, a bale support and transfer mechanism including a bale delivery tray for depositing the bales in a predetermined position on the load bed, a pickup mechanism for moving the bales from the field to the support and transfer mechanism, and a pusher mechanism for moving the bales along the load bed from the predetermined position. A control means coordinates the functioning of the components so as to form a multi-layered stack of bales with each succeeding layer centered on and containing one less row of bales than the previous layer.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 3 is a partial right rear perspective of the forward portion of the bale wagon of the instant invention;

FIG. 4 is a partial sectional top plan view of the bale delivery tray area taken along lines 4—4 of FIG. 1;

FIG. 5 is a cross sectional view of the bale delivery tray taken along lines 5—5 of FIG. 4;

FIG. 6 is a cross sectional view of the right side tray guide roller support and angled bale delivery tray support taken along lines 6—6 of FIG. 5;

FIG. 7 is a cross sectional view of the right side tray guide roller support and angled bale delivery tray support taken along lines 7—7 of FIG. 5;

FIG. 8 is a schematic representation of the end trip linkages for releasing the bale delivery tray;

FIG. 9 is a right front perspective view of the cross conveyor;

FIG. 10 is a cross sectional view of the cross conveyor taken along lines 10—10 of FIG. 9.

FIG. 11 is a partial cross sectional view of the cross conveyor taken along lines 11—11 of FIG. 9;

FIG. 12 is a partial cross sectional view of the cross conveyor, similar to FIG. 11, showing the bale engaging tine in the retracted position;

FIG. 14 is a frontal cross sectional view of a portion of the pusher mechanism taken along lines 14—14 of FIG. 13;

DESCRIPTION OF THE PREFERRED EMBODIMENT

Figure 1:
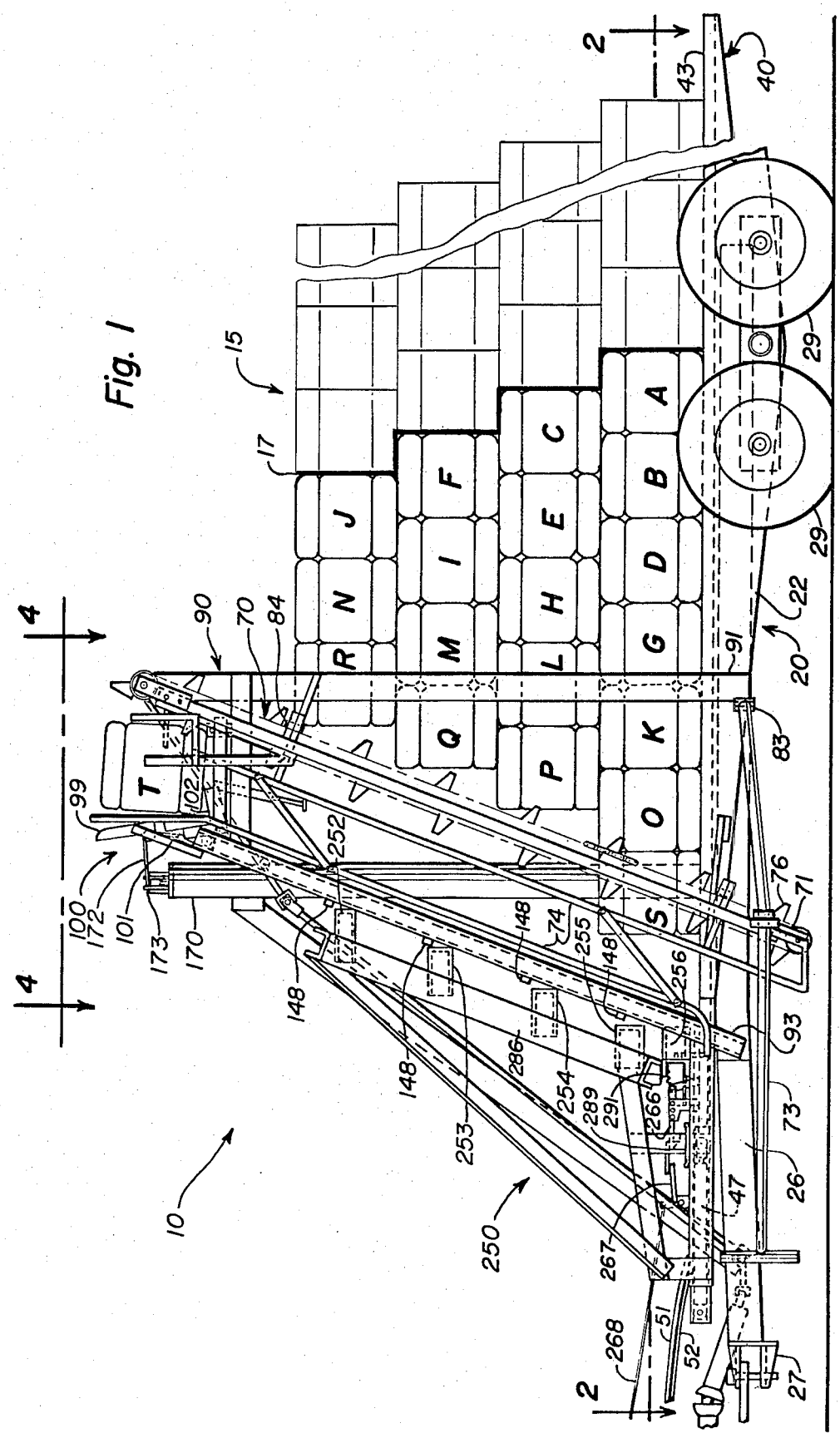
FIG. 1 is a side elevational view of the bale wagon of the instant invention.

The bale wagon to be described is generally intended to build a pyramid-like stack of bales which may be selectively deposited at any desired location. Referring to FIG. 1, the bale wagon 10 is shown to comprise a mobile frame 20 with a load bed 40 pivotably affixed thereto, a bale loader 70 for picking up bales from the ground and depositing them on delivery tray 100, and a pusher mechanism 250. By way of an introductory description of the operation of bale wagon 10, assume that it is desired to build a pyramid-like stack of bales on the load bed 40. Bales are serially picked up and elevated by bale loader 70 whereupon they are deposited in a row on delivery tray 100. When delivery tray 100 is loaded, it slides downwardly along support structure 90 toward load bed 40, carrying with it the row of bales. A trip mechanism on the delivery tray dumps the row of bales whenever it is activated by either the surface of the load bed 40 or a bale in a previously deposited row. A return mechanism causes delivery tray 100 to seek the neutral position shown in FIG. 1 once a row of bales has been dumped. In this manner the delivery tray moves up and down along a predetermined path, depositing the bales at the proper level therealong. The pusher mechanism 250 oscillates, under control of the operator, to engage the forward surface of the bales and move them rearwardly the distance of one bale width. (Actually, the bales are moved a slightly greater distance to accommodate bale "spring back.") Thus, if a stack of bales, like 15, is to be formed (assume dark line 17 is the rear of the stack) the first row of bales delivered to the load bed 40 would be row (A). The pusher 250 would move row (A) rearwardly one bale width. The next row delivered would be (B). Then, row (C) would be delivered. The bale rows (B) and (C) would be engaged by pusher mechanism 250 and moved rearwardly one bale width. Rows (D), (E) and (F) are then delivered. The delivery of further bales and the actuation of pusher 250 results in the construction of a pyramid-like stack of a width and height determined by machine dimensions. When the stack is completed, the pusher 250 is placed in a non-oscillatory mode to push the stack off the back end of the pivotable load bed 40.

The terms "pyramid," "pyramid-like" and other similar terms as used herein are intended to encompass a stack of bales, such as 15 in FIG. 1, in which each succeeding layer of bales is less in number than the preceeding layer. Though mechanisms could be provided to do otherwise, it is generally contemplated that each row in the stack will contain the same number of bales, but each layer will contain a lesser number of rows. Thus, the step-like edge configuration only appears on the forward and rearward edges of the stack.

Figure 2:
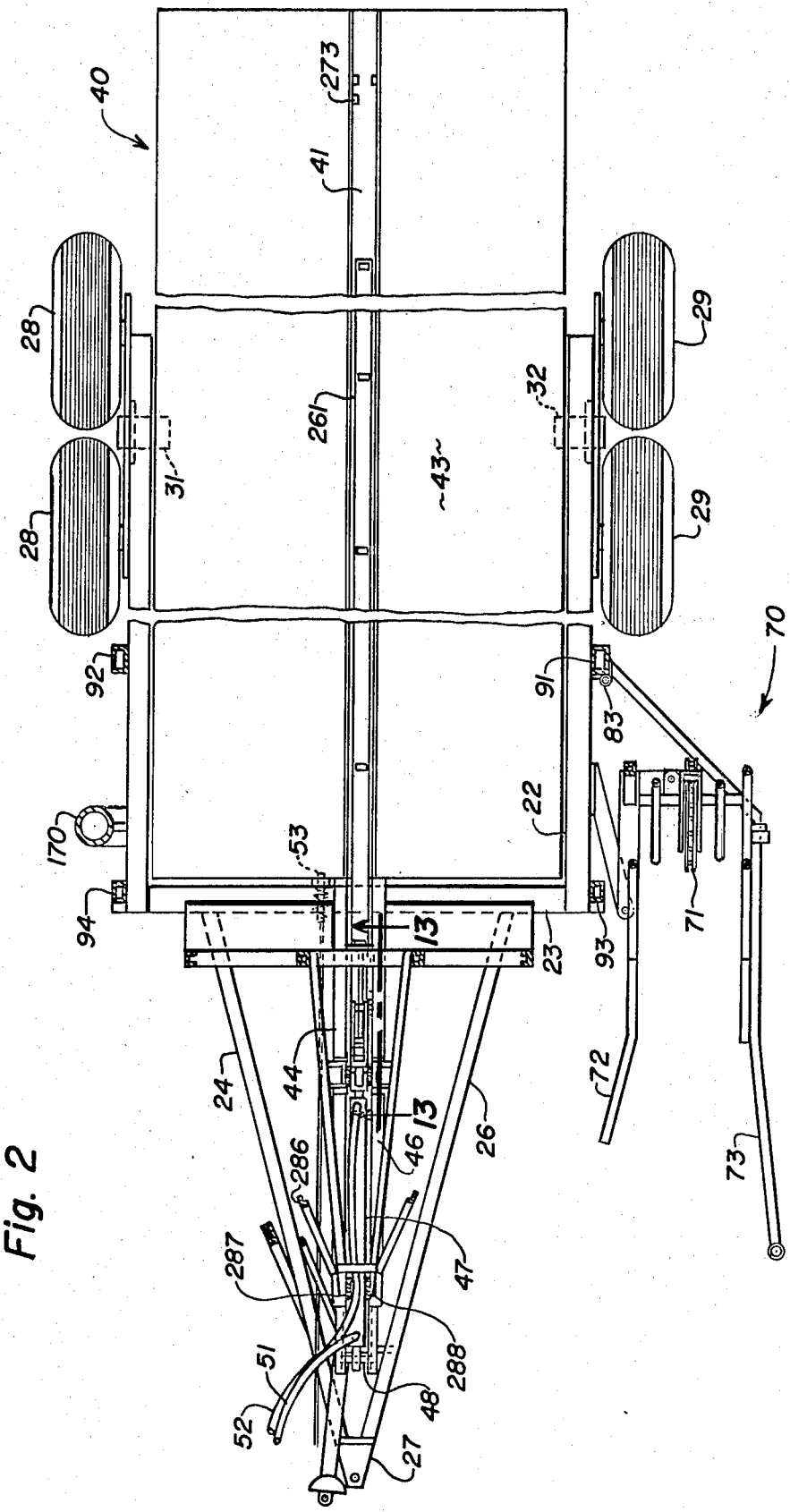
FIG. 2 is a sectional top plan view of the machine of FIG. 1 taken along lines 2—2 thereof.

It can be seen in more specific detail in FIGS. 1-3 that main frame 20 is a rigid structure with a generally U-shaped planar appearance comprising right and left parallel side arm members 21 and 22, respectively, and a forward cross member 23. Forwardly converging frame members 24 and 26 are rigidly affixed at one end to cross member 23, and terminate at clevis 27 which is the means by which the bale wagon 10 is attached to a tractor or other towing vehicle.

Two pairs of tandem wheels 28, 29 are affixed, respectively, to arm members 21 and 22 of the main frame 20 by pivot pins 31 and 32. The wheel pairs may thus pivot relative to the main frame 20 to improve the motion and suspension characteristics of the vehicle.

The load bed 40, also as perhaps best seen in FIGS. 1-3, is a composite structure intended to be low in mass, yet high in strength. The bed as seen in FIGS. 2 and 3 includes an upwardly opened elongate channel beam 41 which extends from the rear of the bed, centrally thereof, to the forward end. Smaller channel members 42 form a generally rectangular horizontal frame with the beam 41. With the addition of sheet metal plates, flat or corrugated, a composite surface 43 is formed upon which the bales are deposited during the stack formation process.

The load bed 40 further includes a forwardly projecting structure which can best be seen in general in FIGS. 2 and 3. A pair of opposing parallel channel members 44 and 46 are rigidly affixed to and extend forwardly of the main bed to a location behind clevis 27. The members 44 and 46 are spaced apart a distance substantially equal to the width of channel beam 41 and generally form an extension thereof. A hydraulic cylinder 47 (see FIG. 2), the purpose of which will be described below, is mounted between members 44 and 46 (or extensions thereon) by a pin 48. Hydraulic hoses 51 and 52 extend from cylinder 47 to an appropriate hydraulic control mechanism (not shown, but known in the art as, for example, a control valve between a tank and a source of pressurized fluid) on the towing vehicle.

It is, for reasons to be understood shortly, desirable for cylinder 47 to operate in a path substantially parallel to surface 43 of load bed 40. Therefore, as seen best in FIG. 1, converging frame members 24 and 26 of main frame 20 angle downwardly as they converge. Thus, the channel members 44 and 46, and therefore cylinder 47, may be parallel to the bed surface 43. Of course, as can be seen, particularly in FIG. 3, cross member 23 of the main frame is centrally split to accommodate channel members 44 and 46. A brace (not shown) across the underside of the gap and cross member 23 will maintain the structural integrity of the main frame.

Finally, load bed 40 is pivotally affixed to main frame 20 by pivot pins 31 and 32. The normal position of the load bed is horizontal as shown; however, during the unloading process, the rear portion of the bed is pivoted downwardly to permit the formed stack to be pushed off onto the ground. A simple spring loaded lock pin 53 is manually operated from the towing vehicle to permit the load bed to pivot relative to the main frame. The pusher mechanism 250 moves with the load bed.

A bale loader 70 is affixed to the left hand side of load bed 40 and is designed to pick up bales lying flat on the field and deliver them serially on edge to the delivery tray 100. As the bale wagon 10 is towed through the field, the bales are directed to elongate endless conveyor 71 by guide members 72 and 73 (see FIG. 2). A generally rectangular open ended frame 74 (see FIGS. 1 and 3) guides the bales upwardly and maintains them in the proper position to be engaged and elevated by lugs 76 on endless conveyor 71. When the bales reach the top of the conveyor their leading edge engages bale shoe 77 which causes them to flip edgewise onto delivery tray 100. The conveyor 71 is driven mechanically by square shaft 78 which telescopingly fits over driven square shaft 79.

The bale loader 70 is, for convenience during transport and storage, pivotally affixed to main frame 20 and support frame 90. Pivot connections 81, 82, 83, 84 and the telescoping feature of shafts 78 and 79 permit the loader 70 to be pivoted forwardly and somewhat toward the right side of the machine to provide increased road clearance.

The delivery tray 100 is supported above the forward portion of the load bed 40 by a support frame 90 which also serves as a guide track for the delivery tray as it moves between neutral and delivery positions. Referring now primarily to FIG. 3, it can be seen that support frame 90 comprises four major generally upright structural components, 91-94. The two rearmost, 91 and 92, of these upright components are substantially vertical while the forwardmost, 93, 94, are parallel and angularly displaced from the vertical. Each of the elements 91-94 are rigidly affixed to main frame 20. Brace members 95 and 96 add longitudinal stability to each side by rigidly interconnecting the respective side components. Transverse stability is provided, in part, by trusses 97 and 98 which interconnect vertical support members 91 and 92. Further transverse stability is provided by forward bale guide 99 which is structurally connected to angled support members 93 and 94.

Vertical structural members 91 and 92 are each shown as comprising two parts, one of which is much shorter than the other and above, respectively, side braces 95 and 96. For purposes of description, it will be assumed that any further reference to members 91 and 92 includes both parts of each.

Angle structural members 93 and 94 further serve as guides for delivery tray 100 as it moves upwardly and downwardly between neutral and delivery positions. A brief reference to FIGS. 5–7, particularly the latter two, shows that members 93 and 94, in cross section, have the configuration of a partial box beam into which the guide rollers on the delivery tray fit.

Referring now in a general manner to FIGS. 1, 3 and 5, a description of the major components and operation of delivery tray 100 will be given. The basic elements of the delivery tray are a tray back 101, a pivotable tray bottom 102, and a rear bale guide 103. All three of these elements are interconnected such that they form a unitary structure which receives and holds bales up to a predetermined number, the receipt of which causes the delivery tray to move downwardly along angled supports 93 and 94 to deposit bales in the proper location for stack formation.

Now, more specifically, tray back 101 and bale guide 103 are rigidly connected by opposing end braces 104 and 106. The bale guide 103 is adjustably affixed to brace 106 by a slot and bolt arrangement (see FIG. 5) which permits selective manual accommodation of differing bale size and density conditions. Tray bottom 102 is pivotally connected to end braces 104 and 106 by pins, one of which, 107 can be seen in FIG. 5. This figure also shows, in dotted line, the position of tray bottom 102 after dumping.

The embodiment shown is a two bale wide stack forming machine. Thus, the first bale delivered to the tray 100 is pushed to the right side of the tray by the second bale. When the outside end of the first bale contacts end trip 108 the tray drops downwardly from its neutral position. End trip 108 controls (as seen in FIGS. 4, 5 and 8) latches at the two opposing ends of tray 100. End trip 108 is pivotally mounted to side brace 96. A right side latch 109 comprises a roller 111 rigidly fixed to end trip 108 via arm 112 and a cooperating catch made up of angled guide surface 113 and flat retaining surface 114. When end trip 108 is moved to the dotted line position of FIG. 8, roller 111 disengages retaining surface 114, releasing the right side of tray 100. When the tray returns to the neutral position, roller 111 engages surface 113 which guides the roller into the locked position with retaining surface 114.

The left side latch 116 comprises the same structural elements as right side latch 109 and is simultaneously activated therewith. A horizontal rod 117 rigidly interconnects end trip 108 and arm 118 such that arm 118 pivots with end trip 108. Elongate rod 119 interconnects arm 118 with another arm 121 on left side. Arm 121 is, in turn, rigidly connected to roller arm 122 via rod 123. Arm 121 is biased in a clockwise direction by spring 124 whereby both latches 109 and 116 are constantly urged to the locked position.

The mechanism and linkages for controlling the dumping of bales from delivery tray 100 are best shown in FIGS. 4 and 5. Generally, bales are received and held by delivery tray 100 in the neutral position in the attitude shown by bale 126 in FIG. 5. The bales are cocked somewhat rearwardly and rest upon tray bottom 102 and rear bale guide 103, and are maintained in this attitude until delivery. At the appropriate location, tray bottom 102 is released to pivot, thus causing the bales to drop vertically as shown in dotted line to be deposited in the proper location for stack formation.

A tray trip lever 130 (see FIG. 5) comprises a foot 131 pivotally affixed by pin 132 to an arm 133 which is rigidly attached to, and depending downwardly from, end brace 106. Arm 133 is generally vertical or slightly angled forwardly, while foot 131 extends angularly inwardly (see FIG. 3) to make better contact with a tripping surface. Directing attention again to FIGS. 4 and 5, it can be seen that an elongate rod 134 interconnects foot 131 with a lever arm 136 which is rigidly affixed to horizontal rod 137. When foot 131 is pivoted upwardly, rod 134 is pulled downwardly, pulling lever arm 136 and rotating rod 137. Another lever arm 138 is affixed to the opposing end of rod 137, such that rotation of rod 137 causes arm 138 to rotate an equal amount. A flexible cable 139 is affixed at one end to lever arm 138 directed around pulley 141 and affixed at the other end to roller arm 142. Roller arm 142 is pivotally affixed to a bracket on tray back 101 by a pivot pin 143, and includes a roller 144 on the lower rear end thereof. Roller 144 is biased into locking contact with tray bottom latch member 146 by spring 147. Tray bottom latch member 146 is affixed to tray bottom 102 such that when the roller arm 142 is in the solid line position of FIG. 5, the tray bottom is locked in the closed (bale holding) position, and when in the dotted line position, the tray bottom is in the release position (bale drop). Thus, when the tray trip lever 130 is activated, the cable 139 is pulled and the tray bottom is allowed to drop, depositing bales in the desired location.

Because of the combined mass of the bales and the delivery tray, there is a tendency for the mechanism to "fly by" the proper position for dumping the bales during the deposit step. To overcome this, mechanism is provided for preventing the delivery tray from going lower than the optimum position. Referring to FIG. 4, it can be seen that angled support members 93 and 94 each support a plurality of stops 148 spaced along the forward edge thereof (refer also to FIG. 1). Two tray stop latches 149 and 151 are affixed to the respective ends of the bale delivery tray. Each tray stop latch comprises a pivot arm 152 and a spring 153 to bias the pivot arm in the unlocked position. A control member 154 is pivotally affixed to delivery tray 100 by a pivot pin 156. Opposing ends of the control member are affixed to cables 157 and 158 which are, respectively, affixed to the tray stop latches 149 and 151. Spring connectors 159 and 161 maintain a balancing tension on the cables 157 and 158. Cable 139 of the tray trip mechanism is affixed to control member 154 at 162 whereby an action which trips foot 131 also causes tray stop latches 149 and 151 to move outwardly to the locking position. Since each of the stops 148 are positioned at the proper location for bale deposit, the stop latches 149 and 151 are activated at the precise moment to engage the proper bale stop, beyond which the delivery tray will not travel.

The delivery tray 100 is biased into the neutral position by a mechanism which includes a vertical cylindrical tube 170 (see FIGS. 1–4), and a movable weight 171. The vertical tube 170 is affixed to the forward portion of main frame 20 and extends to a point substantially parallel to the delivery tray when in its neutral position. A cable 172 (see FIGS. 3 and 4) extends from the weight around pulley 173 on vertical tube 170, around pulley 174 on delivery tray 100 to a point 175 on the delivery tray where it is fixed. The weight 171 is shaped to conform substantially to the diameter of tube 170 so that air passage therearound is restricted, thus providing a cushioning action to the movement of the delivery tray. Furthermore, the mass of the weight 171 is slightly larger than the mass of the emptied delivery tray 100 so that the tray is biased upwardly to the neutral position.

A spring 176 interconnects tray bottom 102 with tray guide roller support 181 to bias the tray in the closed (bale supporting) position. Thus, after dumping, the tray returns to the proper position simultaneous with a return to the upper neutral position. Another similar spring 177 is affixed to the left end of the delivery tray to insure a balanced biasing force.

As previously noted, the bale delivery tray 100 moves upwardly and downwardly along the angled support members 93 and 94 between the upper neutral position and a lower delivery position. Each lateral side of the delivery tray is affixed rigidly to a tray guide roller support, both of which, 180 and 181, can be seen in FIG. 4. As shown in FIGS. 5 through 7, tray guide roller support 181 has four rollers affixed thereto, 182, 183, 184 and 186. The rollers alternate in direction as shown in FIG. 5 to, when engaged within angle support 94, rollingly support the movement of the tray in all directions. The left side tray guide roller support is the reverse of that shown in FIG. 5, but is not shown in detail in any of the figures.

As the bales reach the top of the bale loader, they are turned by bale shoe 77 and deposited on the left end of the bale delivery tray 100. As generally seen in FIG. 3, the bales deposited on delivery tray 100 are engaged by a cross conveyor 190 which moves the bales toward the right end of the delivery tray. Cross conveyor 190 only partially corresponds to the length of the bale tray, so the first bale on the tray is only pushed partly toward the right end thereof. Upon the deposit of the second bale, the cross conveyor forces it into contact with the first bale and moves the first bale to the end of the delivery tray and into engagement with end trip 108. The cross conveyor mechanism is rigidly affixed to transverse truss 97 and does not move with the delivery tray. Motive power for the cross conveyor is supplied from the tractor or towing vehicle via PTO extension 191, universally connected drive shafts 192 and 193, through bevel gears to a third drive shaft 194, which supports bevel gear 196. Bevel gear 196 mates with bevel gear 197 which rotates crank arm 198. Drive shaft 194 extends onwardly to drive the bale loader 70, as previously discussed.

Referring now to FIG. 9, the cross conveyor 190 will be discussed in further detail. A rectangular box-like housing 200 has an elongate slot 201 formed along the length of one side thereof. The partial sides of the housing 200 cooperatively form elongate tracks 202 and 203 with guide members 204 and 206. A tine support bar 207 is movably positioned within the tracks 202 and 203 to reciprocate along the length of the slot 201 in housing 200. A plurality of bale engaging tines 208-210 are affixed to tine support bar 207 such that rotation of crank arm 198 transmits linear reciprocating motion to the tine support bar 207 via arm 211.

The tines 208-210 are affixed to tine support bar 207 in such a manner that they engage and move the bales when moving toward the right side of the machine, but pivot to disengage the bales when moving in the opposite direction. More specifically, reference is made to FIGS. 10 through 12 wherein it can be seen that each tine comprises an elongate element extending movably through an opening 212 in the tine support bar 207. The tine 208 (and all others) further comprises a pair of angularly related cross bars 213 and 214 which are affixed to the tine 208 on opposing sides of tine support bar 207. An angled stop 216 is affixed to the tine support bar 207 and partially surrounds the opening 212 through which the tine extends. A spring 217 biases the tine into a locked position, shown in solid line in FIG. 10, wherein cross bar 213 is in engagement with the inside surface of tine support bar 207 and cross bar 214 is engaged with angled stop 216.

Directing attention to FIGS. 11 and 12, the operation of the tines, as exemplified by tine 209, can be seen. A bale 218 is shown in dotted line to be engaged by tine 209 while the tine support bar 207 is moving in the direction of arrow 219. The tine 209 is shown in its locked position whereby the bale is moved in the direction of arrow 219. In FIG. 12, the tine support member is being moved in the opposite direction, i.e., the direction of arrow 221. The cross bars 213 and 214 are in an unlocked position and the tine is allowed to pivot, thus disengaging the bale 218. As soon as the tine passes the end of the bale, the spring 217 returns the tine to the locked position for engagement with the next succeeding bale. Even if the tine does not move past the end of the bale, a reversal of direction of tine support will cause the tines to "dig" into the bale and force it toward the opposite side. Once end trip 108 is activated the bales move downwardly, even though the second bale is engaged by the conveyor tines. As seen in FIG. 10, the tines may also pivot to disengage the bales as the delivery tray moves toward the delivery position.

Figure 13:
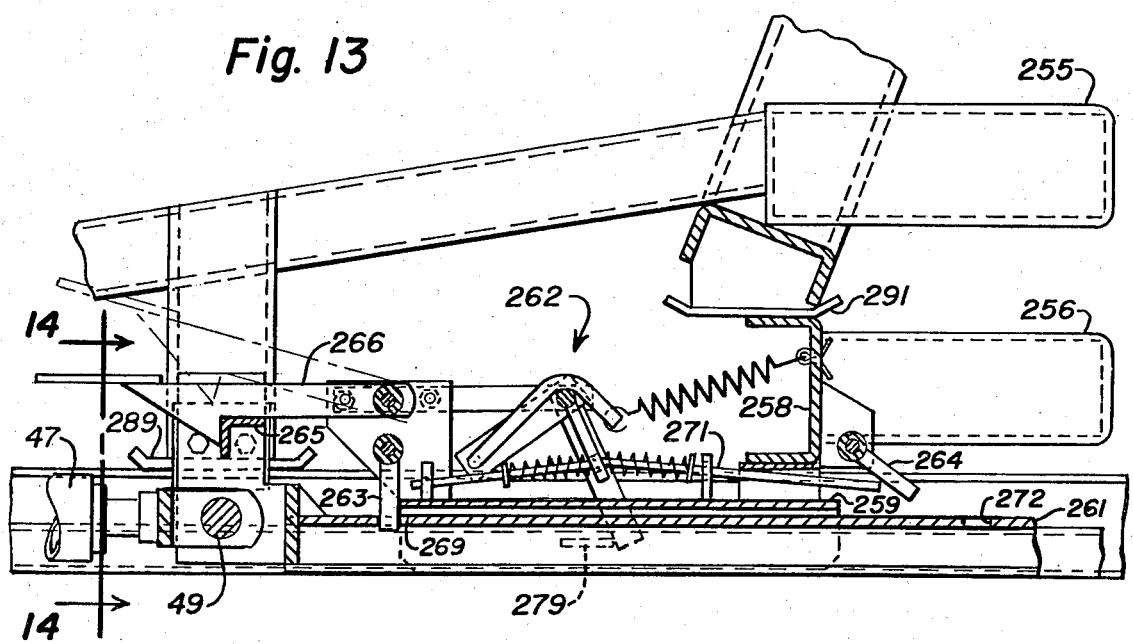
FIG. 13 is a partial cross sectional view of a portion of the pusher mechanism taken along lines 13—13 of FIG. 2
Figure 15:
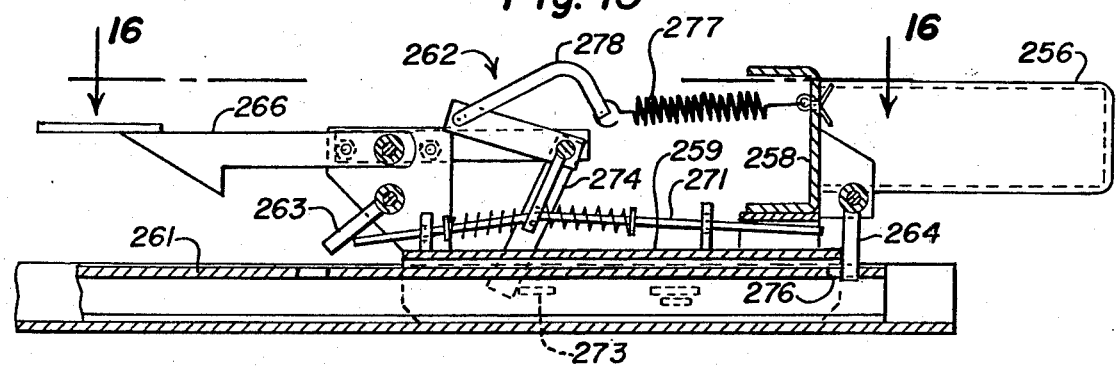
FIG. 15 is a partial cross sectional view of the carriage and over-center mechanism at the rearward end of the load bed.
Figure 16:
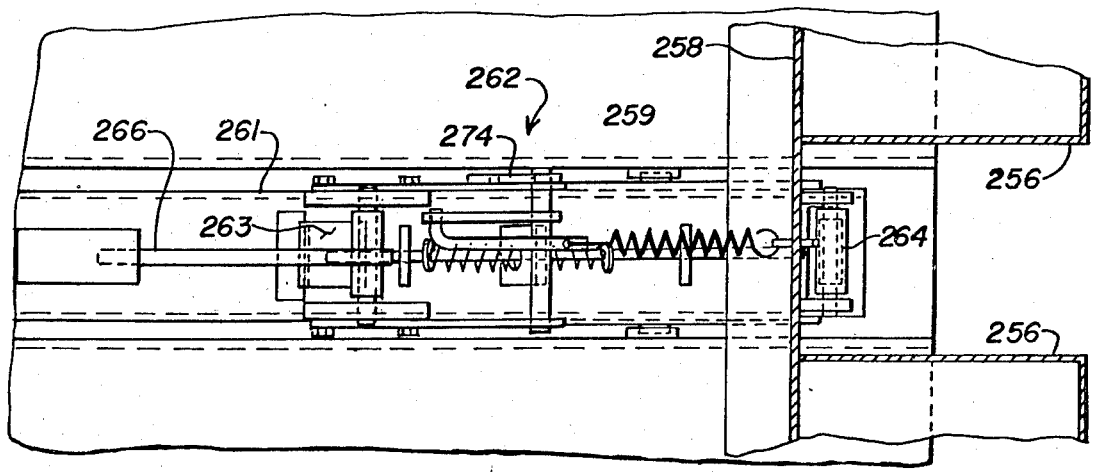
FIG. 16 is a partial top sectional view of the carriage and over-center mechanism taken along lines 16—16 of FIG. 15.

The final major element of the bale wagon to be described is the pusher mechanism 250 which moves the bales rearwardly in cooperation with the delivery tray actuation to form the pyramidal stack or, alternatively, to push the completed stack off the load bed 40 onto the ground. The pusher mechanism 250 is concerned primarily with the selective movement of bale engaging surfaces to 252-256 (see FIG. 1) with the forward edges of the bale stack 15 and the rearward movement thereof during the formation of a pyramidal stack. Note that, in FIG. 3, each of the bale-engaging surfaces 252-256 are the rear surfaces of bow-like members which are separated centrally by a gap. For purposes of discussion, reference to any single bale-engaging surface is intended to encompass both surfaces on either side of the central gap. Bale engaging surface 256 is rigidly affixed to frame member 258 which is supported by a carriage 259 (see FIG. 13) which is, in turn, slidably mounted on elongate box-like beam 261 (see FIGS. 2 and 3). Elongate box-like beam 261 is slidably supported within inverted channel beam 41 and is affixed at the forward end thereof to hydraulic cylinder 47 by pin 49 (see FIG. 13). Thus, extension of the hydraulic cylinder 47 causes beam 261 to move rearwardly within channel 41. Contraction of cylinder 47 causes an opposite movement of beam 261. The top surface of beam 261 contains a plurality of holes therein (see, for example, FIG. 2) which cooperate with the over-center mechanism to be described to cause the bales to be pushed off the rear of the load bed 40. An over-center mechanism 262 (see FIGS. 13 through 16) controls the position of ratchet teeth 263 and 264 and their respective engagement with the holes in the channel 261 to determine whether the carriage 259 moves rearwardly over the load bed or forwardly toward the front of the load bed. More specifically, carriage 259 supports a pivotable latch 266 which is normally engaged with cross member 265 as part of the upper pusher mechanism to be described further below. A latch trip 267 (see FIG. 1) is manually operable via cable 268 to raise latch 266 to the dotted line position of FIG. 13. Thus, as viewed in that figure, ratchet tooth 263 is engaged with hole 269 at the forward end of beam 261, and latch tooth 264 is raised to an inoperable position by the location of rod 271. Extension of cylinder 47 pushes carriage 259 rearwardly the length of the stroke of the cylinder, i.e., slightly more than one bale width. When the cylinder is reversed in direction, the next succeeding hole 272, is brought into engagement with ratchet tooth 263. Then, the next extension of cylinder 47 pushes the carriage back for engagement with the next succeeding hole. This process is repeated until the carriage reaches the end of beam 261, at the rear of the load bed, whereupon lug 273 trips arm 274, moving rod 271 forwardly to raise ratchet tooth 263 to the inoperable position and allowing free pivot of ratchet tooth 264. As seen in FIGS. 15 and 16, ratchet tooth 264 is then in a position to engage hole 276 in beam 261. Spring 277 and lock arm 278 are now over center and hold rod 271 in the position shown. Continued reciprocable operation of the cylinder 47 causes the carriage 259 to reverse its direction until arm 274 is tripped by lug 279 at the forward portion of the machine (as shown in FIG. 13) throwing spring 277 and lock arm 278 over center in the opposite direction. When the carriage returns to the forward portion of the machine latch 266 once again engages member 265. The stack 15 is thus pushed off the end of the load bed 40 and onto the ground.

The upper bale engaging surfaces 251 through 255 are affixed to an inverted V-shaped frame 286 which is, in turn, slidingly supported on channel members 44 and 46 (see FIGS. 1, 2 and 14) by C-shaped clamps 287 and 288 and slidable foot support pairs 289 and 291 (see FIG. 13). Member 265 to which latch 266 is releasably engaged is also supported on the frame member 286. When the latch 266 is released, the carriage 259 can move independently of frame 286, and thus bale-engaging surfaces 252-255. During the formation of a stack, latch 266 is in the locked position and all the bale engaging surfaces oscillate in unison.

In operation, the bale wagon 10 is guided through the field so that bales are serially engaged by the pickup 79 and delivered on edge to the delivery tray 100. The first bale deposited on delivery tray 100 is engaged by cross conveyor 190 and moved partially across the tray. The second bale delivered is also engaged by cross conveyor 190 and moved toward the right, thus forcing the end of the first bale into contact with end trip 108. Left and right side delivery tray latches 109 and 116 are thereby tripped to release the delivery tray and allow it to proceed angularly toward load bed surface 43. The delivery tray proceeds downwardly until foot 131 of tray trip 130 is pivoted by engagement with surface 43. Delivery tray bottom 102 is thereby released and simultaneously therewith tray stop latches 149 and 151 are pivoted outwardly to engage the lowermost stops on either side of the angled support members 93 and 94. The two bales then drop a short distance onto surface 43 whereby they become the first row of bales delivered to the load bed. Weight 171 pulls delivery tray 100 upwardly to the neutral position while springs 176 and 177 return tray bottom 102 to its locked position. The operator then actuates cylinder 47 to move bale-engaging surfaces 252–256 rearwardly a distance slightly greater than the width of a single bale. When cylinder 47 is retracted, conditions are set for the delivery of a second row of bales which are deposited adjacent the first row on load bed 40. Because the third row of bales is placed centrally above the first two rows of bales, the cylinder 47 is not actuated after delivery of the second row. Foot 131 is tripped to deposit this row by the right side bale of the second row. The sequence is then repeated until the load bed is completely filled to capacity.

To unload the bale wagon, the operator must first release lock pin 53, permitting load bed 40 to pivot rearwardly. Then, the operator must release latch 266 to permit the carriage 259 to move bale-engaging surface 256 rearwardly independently of bale-engaging surfaces 252-255 to push the stack off the rear end of the load bed. Sequential operation of the hydraulic cylinder results in the return of carriage 259 to the forward portion of the machine for automatic locking in position. The machine is then ready to repeat the entire process.

It will be understood that various other changes of the details, materials, steps, arrangements of parts and uses which have herein been described and illustrated in order to explain the nature of the invention will occur to and may be made by those skilled in the art, upon a reading of this disclosure, and such changes are intended to be included within the principles and scope of this invention.

For example, the machine described herein is generally under the manual control of an operator. It is contemplated that most or all of these operations could be automated by the inclusion of mechanical, hydraulic or electric control devices. Moreover, one of skill in the art will readily recognize that load capacities can be modified by increasing the width and/or length of the machine, or by increasing the number of vertical layers which the machine can construct. Also, for example, it is contemplated that a rectangular stack of bales, rather than the pyramidal stack discussed herein, could be made with slight modification to the disclosed structure.

Having thus described the invention, what is claimed is:

1. In an apparatus for stacking articles on a surface, said apparatus including a tray with a normally generally horizontal pivotal article-supporting bottom member having a latching surface thereon, a support means supporting said tray above said surface for movement between a loading position where articles are positioned on said tray and a delivery position closer to said surface where articles are deposited, and means to release said bottom member of said tray for pivotal movement and delivery of the articles, the improvement wherein said means to release comprises:

latch means affixed to said tray for pivotal movement between a latched position wherein said bottom member is held in a generally horizontal position and an unlatched position wherein said bottom member is free to pivot and deliver the articles, a roller arm having a first end and an opposing second end, said first end pivotably affixed to said tray back, and said second end supporting a roller whereby said roller may selectively move into and out of engagement with said latching surface on said bottom member to effect latching or unlatching;

a trip foot affixed to said tray and extending therebelow between said tray and said surface; and linkage means interconnecting said trip foot and said latch means so that said latch means is moved to said unlatched position when said trip foot engages said surface, said linkage means including resilient means interconnecting said trip foot and said roller arm such that activation of said trip foot moves said roller arm and roller to the unlatched position.

2. The apparatus of claim 1, further including spring means operably connected to said bottom member of said tray biasing same to said latched position.

3. The apparatus of claim 2, wherein said tray further comprises a generally vertical tray back to which said bottom member is pivotally affixed.

4. The apparatus of claim 3, wherein said roller arm is biased toward said latched position by a spring means interconnecting said roller arm and said tray back.

* * * * *